United States Patent
Tilleman et al.

(10) Patent No.: US 9,395,542 B2
(45) Date of Patent: Jul. 19, 2016

(54) PROJECTING SYNTHETIC IMAGERY AND SCENIC IMAGERY USING AN OPTICAL COMPONENT COMPRISING A DIFFRACTIVE OPTICAL ELEMENT PATTERN

(71) Applicant: ELBIT SYSTEMS OF AMERICA, LLC, Fort Worth, TX (US)

(72) Inventors: Michael M. Tilleman, Brookline, MA (US); Jon R. Lyford, Londonderry, NH (US)

(73) Assignee: Elbit Systems of America, LLC, Fort Worth, TX (US)

(*) Notice: Subject to any disclaimer, the term of this patent is extended or adjusted under 35 U.S.C. 154(b) by 71 days.

(21) Appl. No.: 14/356,801

(22) PCT Filed: Nov. 7, 2012

(86) PCT No.: PCT/US2012/063948
§ 371 (c)(1),
(2) Date: May 7, 2014

(87) PCT Pub. No.: WO2013/070770
PCT Pub. Date: May 16, 2013

(65) Prior Publication Data
US 2014/0300967 A1 Oct. 9, 2014

Related U.S. Application Data

(60) Provisional application No. 61/556,618, filed on Nov. 7, 2011.

(51) Int. Cl.
*G02B 27/01* (2006.01)
*G02B 27/42* (2006.01)

(52) U.S. Cl.
CPC ........ *G02B 27/0101* (2013.01); *G02B 27/0103* (2013.01); *G02B 27/4205* (2013.01); *G02B 2027/0105* (2013.01)

(58) Field of Classification Search
CPC ........... G02B 27/0101; G02B 27/0102; G02B 27/4205; G02B 27/01

USPC ........ 359/567, 558, 566, 569, 570, 571, 574, 359/575, 576, 13, 618, 629, 630, 631; 345/7–9; 351/1, 15, 19; 353/1, 39, 81, 353/82, 84, 94, 98, 99; 362/257, 268, 290, 362/291, 292, 293
See application file for complete search history.

(56) References Cited

U.S. PATENT DOCUMENTS

| 4,900,133 A | 2/1990 | Berman |
| 5,210,624 A | 5/1993 | Matsumoto |

(Continued)

FOREIGN PATENT DOCUMENTS

| JP | 2000208869 A | * | 7/2000 |
| JP | 2006290102 A | | 10/2006 |

(Continued)

OTHER PUBLICATIONS

International Search Report and Written Opinion dated Mar. 18, 2013, for International Application No. PCT/US2012/063948, international filing date Nov. 7, 2012.

(Continued)

*Primary Examiner* — Scott J Sugarman
*Assistant Examiner* — Kristina Deherrera
(74) *Attorney, Agent, or Firm* — Conley Rose, P.C.

(57) ABSTRACT

A display system includes an optical component having a first and second surface, wherein the first surface comprises a diffractive optical element, and a projector system to create a projected image on the optical component. The projector includes an illumination source that emits electromagnetic radiation within a predetermined spectral band, an image generator that ascribes image characteristics to the radiation, and an optically-powered component that directs the radiation at the first surface of the optical component. The diffractive optical element reflects at least a portion of the radiation in a predetermined direction. The optical component has zero optical power for transmitted light. The optical component transmits at least a portion of the ambient scenery within a predetermined spectral band within a field-of-view of the projected image. The projected image maintains substantial boresight alignment with the ambient image.

32 Claims, 3 Drawing Sheets

(56) References Cited

U.S. PATENT DOCUMENTS

| | | | | |
|---|---|---|---|---|
| 5,455,708 A * | 10/1995 | Harris | ................ | G02B 26/106 359/196.1 |
| 6,005,714 A | 12/1999 | Welch | | |
| 6,424,407 B1 * | 7/2002 | Kinrot | ................ | G01D 5/347 345/166 |
| 6,465,077 B1 * | 10/2002 | Lee | ................ | B41M 3/06 348/13.03 |
| 6,507,419 B1 * | 1/2003 | Popovich | ................ | G02B 5/32 359/15 |
| 7,413,328 B2 * | 8/2008 | Dubin | ................ | G02B 6/0008 345/7 |
| 2002/0021461 A1 * | 2/2002 | Ono | ................ | G02B 5/0252 359/13 |
| 2008/0088529 A1 * | 4/2008 | Tang | ................ | G02B 27/0172 345/8 |
| 2009/0005961 A1 * | 1/2009 | Grabowski | ................ | G01C 21/365 701/532 |
| 2009/0285076 A1 | 11/2009 | Rothenberg | | |
| 2010/0002302 A1 * | 1/2010 | Duparre | ................ | G02B 5/1876 359/571 |
| 2010/0253595 A1 * | 10/2010 | Szczerba | ................ | G01C 21/365 345/7 |
| 2011/0157707 A1 | 6/2011 | Tilleman | | |
| 2012/0075168 A1 * | 3/2012 | Osterhout | ................ | G02B 27/017 345/8 |

FOREIGN PATENT DOCUMENTS

| | | |
|---|---|---|
| JP | 2009229752 A | 10/2009 |
| JP | 2010125910 A | 6/2010 |
| JP | 2011059270 A | 3/2011 |
| WO | 2011113662 A1 | 9/2011 |

OTHER PUBLICATIONS

Canadian Office Action dated Jun. 15, 2015 for corresponding U.S. Pat. No. 2,865,223.

Extended European Search Report, dated Jun. 16, 2015, for corresponding European Application No. EP 12848582.8.

* cited by examiner

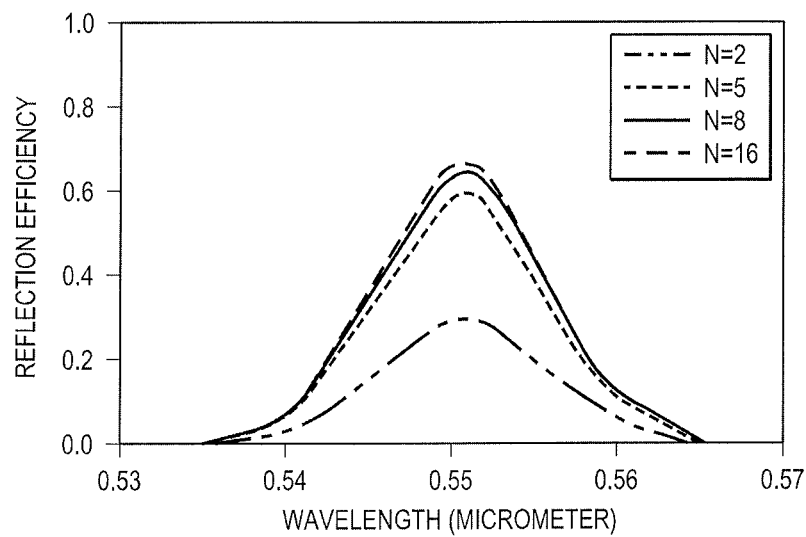
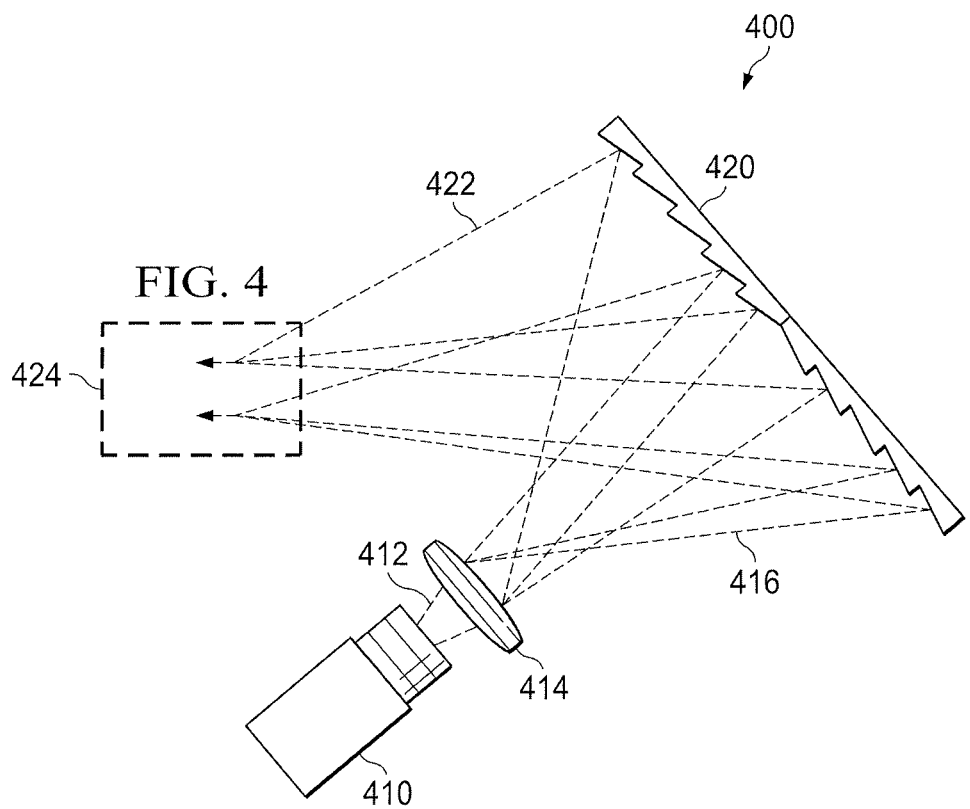

PROJECTING SYNTHETIC IMAGERY AND SCENIC IMAGERY USING AN OPTICAL COMPONENT COMPRISING A DIFFRACTIVE OPTICAL ELEMENT PATTERN

CROSS-REFERENCE TO RELATED APPLICATIONS

The present application claims priority to U.S. Provisional Patent Application No. 61/556,618 filed on Nov. 7, 2011, which is hereby incorporated herein by reference.

BACKGROUND

State of the art Head Up Display (HUD) and Head Mounted Display (HMD) systems may use combiners disposed in the optical path between a user and a windshield, such as on a vehicle or airplane, to overlay synthetic imagery on an image of the outside scenery. Some combiners may have a partially reflective, inward facing surface, whereas some combiners may form the synthetic images in their bulk. Those combiners using a partially reflective, inward facing surface typically have the inward surface made concave, thus acting as an eyepiece. To render a powerless transmissive optic, the outward facing surface is typically made convex. However, the fabrication of such three-dimensional combiners is both complex and expensive.

BRIEF DESCRIPTION OF THE DRAWINGS

For a detailed description of exemplary embodiments, reference will now be made, by way of example only, to the accompanying drawings in which:

FIG. 3 illustrates an example reflective spectrum of an optical component comprising a DOE pattern at the first diffraction order in accordance with various embodiments; and FIG. 4 illustrates an example HUD system using an optical component comprising a DOE pattern in accordance with various embodiments;

NOTATION AND NOMENCLATURE

Figure 1:
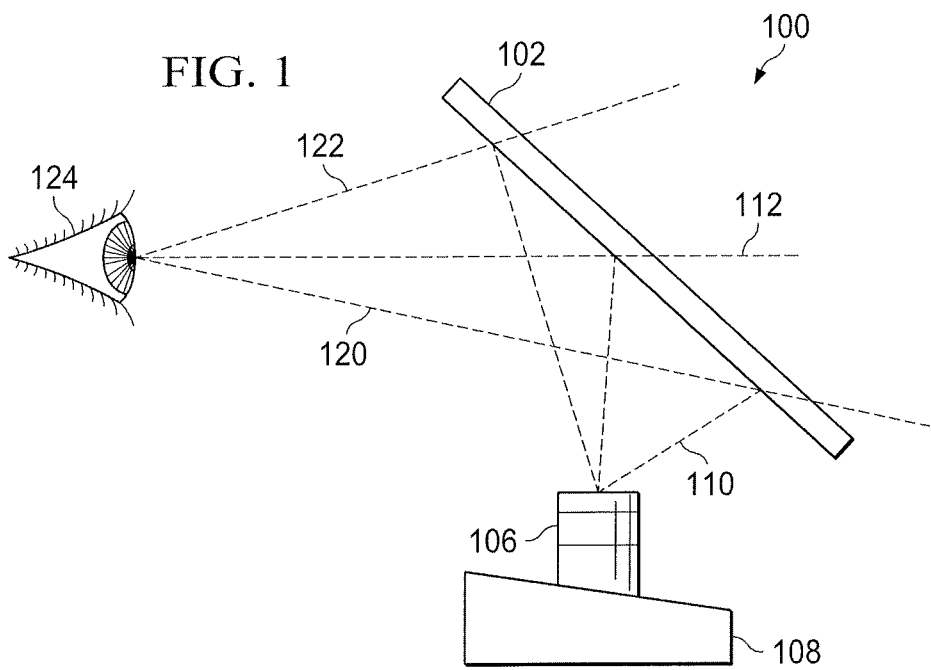
FIG. 1 illustrates an example windshield Head Up Display (HUD) system using an optical component comprising a Diffractive Optical Element (DOE) pattern in accordance with various embodiments.

Certain terms are used throughout the following description and claims to refer to particular system components. As one skilled in the art will appreciate, certain components described herein may be referred to in the industry by multiple names. This document does not intend to distinguish between components that differ in name but not function.

In the following discussion and in the claims, the terms "including" and comprising" are used in an inclusive fashion, and thus should be interpreted to mean "including, but not limited to . . . ", Also, the term "couple" or "couples" is intended to mean either an indirect or direct connection. Thus, if a first device couples to a second device, that connection may be through a direct connection or through an indirect connection via other devices and connections.

As used here, the term "about" shall mean values within plus or minus five percent (+/−5%) of the recited value.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure relates generally to imaging systems, and more particularly to a system and method for projecting synthetic imagery along with scenic imagery using an optical component comprising a Diffractive Optical Element (DOE) pattern.

State of the art Head Up Display (HUD) and Head Mounted Display (HMD) systems may use combiners disposed in the optical path between a user and a windshield, such as on a vehicle or airplane, to overlay synthetic imagery on an image of the outside scenery. Some combiners may have a partially reflective, inward facing surface, whereas some combiners may form the synthetic images in their bulk. Those combiners using a partially reflective, inward facing surface typically have the inward surface made concave, thus acting as an eyepiece. To render a powerless transmissive optic, the outward facing surface is typically made convex. However, the fabrication of such three-dimensional combiners is both complex and expensive.

Accordingly, at least one embodiment of the present disclosure includes an optical component with arbitrary three-dimensional shape that may require lower fabrication costs than previous systems. Such an optical component may be any surface upon which an image can be viewed (i.e., a reflected image), an image can be seen through (i.e., a transmitted image), or both. Thus, such an optical component may be any surface that is either reflective, transmissive, or both. For example, in some embodiments, the optical component may be made of a transmissive substrate, such as crown glass, fused silica, or one or more polymers, and may have any morphology (i.e., the optical component is not required to have a concave inward surface and convex outer surface).

Accordingly, in certain embodiments, the optical component may be the windshield of a car, airplane, or other type of vehicle, regardless of the windshield's shape or morphology. Likewise, in certain embodiments, the optical component may be a mirror, such as a side or rearview mirror in a car or other type of vehicle. In certain other embodiments, the optical component may be an ocular of certain optical hardware, such as an aviator visor in a helmet. In some embodiments, the optical component may be used in lieu of a combiner element in a HUD or HMD system, where the optical component allows a user to simultaneously view rays that are reflected by the optical component and rays that are transmitted by the optical component. For example, some embodiments of the present disclosure may allow for the windscreen of an airplane to simultaneously reflect projected synthetic images and/or symbology and transmit scenic images, such that a user of the airplane may view the synthetic images and/or symbology as if they were superimposed upon the scenic images.

In particular embodiments of the present disclosure, the inward facing surface (i.e., with respect to a user) of the optical component has a binary periodic engraving rendering a Diffractive Optical Element (DOE) pattern that reflects light within a finite spectral band (e.g., the visible spectrum) in a pre-designed direction, and which possesses dioptric power. In some embodiments, the DOE pattern may be designed in order to attribute optical characteristics to the optical component irrespective of its geometrical shape. In certain embodiments, the DOE pattern may attribute the characteristics of spectral reflection within a narrow wavelength band in a particular direction, the collimation of the rays with the wavelength emanating from a projector, and transmission of most of the visible spectrum with substantially no deviation from the incident angle of the transmission rays. Accordingly, the optical component may act as an eyepiece for rays emanating from a projector onto the optical component, and may direct a collimated ray bundle to an eye-motion box. An eye-motion box may refer to a three-dimensional area where rays reflected by the optical component may be viewed by the user.

In particular embodiments, the DOE pattern may comprise a set of fine lines densely spaced, with a typical pitch of 1-10 µm, well below the acuity of a human eye. In such embodiments, the presence of the DOE pattern may not hamper the visibility of either virtual or real images produced by the system. Therefore, in embodiments where the optical component is a windshield, a user may view synthetic imagery and/or symbology (e.g., rays produced by a projector or other light source within the vehicle) superimposed upon scenic imagery (e.g., rays originating outside the vehicle).

In some embodiments, the optical component may comprise an imprinted holographic pattern. In certain embodiments, the optical component shape may be flat. In particular embodiments, the DOE pattern may be formed on an existing vehicle component, such as the windshield or mirror of a vehicle. In other embodiments, the optical component may be constituted on a windshield of an aircraft canopy. In further embodiments, the outer surface of the windshield may be coated by anti-reflective coating in order to maximize transmission of rays that originate outside the vehicle. In some cases, the anti-reflective coating may function throughout the visible band of at least 380-710 nm.

As an example, an optical component may be made out of crown glass and may have a refractive index of 1.525, a reflective coating maximized at 550 nm at a magnitude of 70% with full width at half maximum (FWHM) of 20 nm, a DOE pattern having a blazing angle of 20°, eight (8) phase level structure with a depth of 0.18 um per level, and the reflection design is optimized for 550 nm at the first diffraction order. Using this set of parameters, the optical component may have a reflection angle of 23° for a 20° angle of incidence and a peak reflection of 63%. In addition, the transmission for the transmitted rays at the zero diffraction order (forward, on-axis direction) may be 89% outside of the reflection band and 27% within the reflection band.

As another example, an optical component may comprise a diffractive focusing mirror which may comprise a diffractive phase level structure that is rendered as a pattern of concentric circles, in which the line period is determined by the wavelength and mirror F-number. In an example where the F-number is 2 and the wavelength is 550 nm, the line period of the concentric circles would be 2.2 um. The F-number pertains to a certain selected wavelength, and that other wavelengths, if reflected, will form different F-numbers according to the laws of optical diffraction. Furthermore, the sensitivity of a DOE focusing mirror to wavelength permits its application as a multi-color combiner element, enabling depth perception to a viewer based on color. For instance, the optical component having an F-number of 2 at the wavelength of 550 nm (green visible light) may have an F-number of 2.39 at the wavelength of 460 nm (blue visible light) and an F-number of 1.74 at the wavelength of 633 nm (red visible light). In particular embodiments, all three wavelengths will render images at disparate planes if illumination using the three colors is provided.

As explained above, the optical component may act as an eyepiece and, as a result, adjacent placement of a projector to the optical component may enable the realization of a compact projector system. Thus, in accordance with various embodiments, placement of the optical component and projector system in constricted spaces is enabled. For example, in particular embodiments, a projector system may be disposed in the dashboard of a vehicle and may be aimed at an optical component. In some embodiments, the projector system may be disposed above an optical component, with the projector aimed at the optical component. In other embodiments, the projector system may be disposed at the side of an optical component with the projector being aimed at the optical component.

Materials of choice for the optical component substrate may be transparent in the visible range of the electromagnetic spectrum. For example, in some embodiments, the optical component may be made of crown glass. In other embodiments, the optical component may be made of fused silica. In certain embodiments, the optical component may be made of a polymer. In further embodiments, the optical component may be made of photochromic glass. Photochromic glass has particular application where the outside scenery contains large amounts of solar illumination. In such a situation, the photochromic glass may attenuate the transmission of the solar light, thus enhancing the contrast of the synthetic image to the scenic image and creating better visibility to the user.

Although example implementations are illustrated below, the present disclosure should in no way be limited to the example implementations, drawings, and techniques illustrated below. Additionally, the drawings are not necessarily drawn to scale. Although particular embodiments are explained herein with reference to HUD and/or HMD systems using an optical component comprising a DOE pattern, particular systems and methods disclosed herein may be used to project synthetic imagery along with scenic imagery using an optical component comprising a DOE pattern in any suitable application.

FIG. 1 illustrates an example windshield HUD system using an optical component 102 comprising a DOE pattern. Cockpit 100 may comprise a windshield optical component 102 along with a projector 106 disposed in a dashboard 108. The projector 106 comprises an illumination source and an image generator (not shown). The illumination source emits electromagnetic radiation within a predetermined spectral band, such as the visible frequency band, and the image generator ascribes image characteristics to the radiation. For example, synthetic imagery and/or symbology may be ascribed to the radiation such that, when reflected off of the optical component 102 toward a user 124, the user 124 views the synthetic imagery and/or symbology as an overlay of scenic imagery transmitted by the optical component 102. The projector 106 may also comprise one or more optically-powered (i.e., having optical power) components such as lenses to direct the radiation at the inner surface of the optical component 102.

Rays 110 represent light rays that are emitted from projector 106, which may have synthetic imagery and/or symbology ascribed to them, while rays 112 represent light rays that originate at an object outside of cockpit 100. In some embodiments, rays 110 and 112 may be combined by diffractive reflection and transmission, respectively, at the optical component 102, and may propagate thereafter as rays 120 and 122. Rays 120 and 122 may then propagate to an eye-motion box located at or near the head of a user 124.

Figure 2:
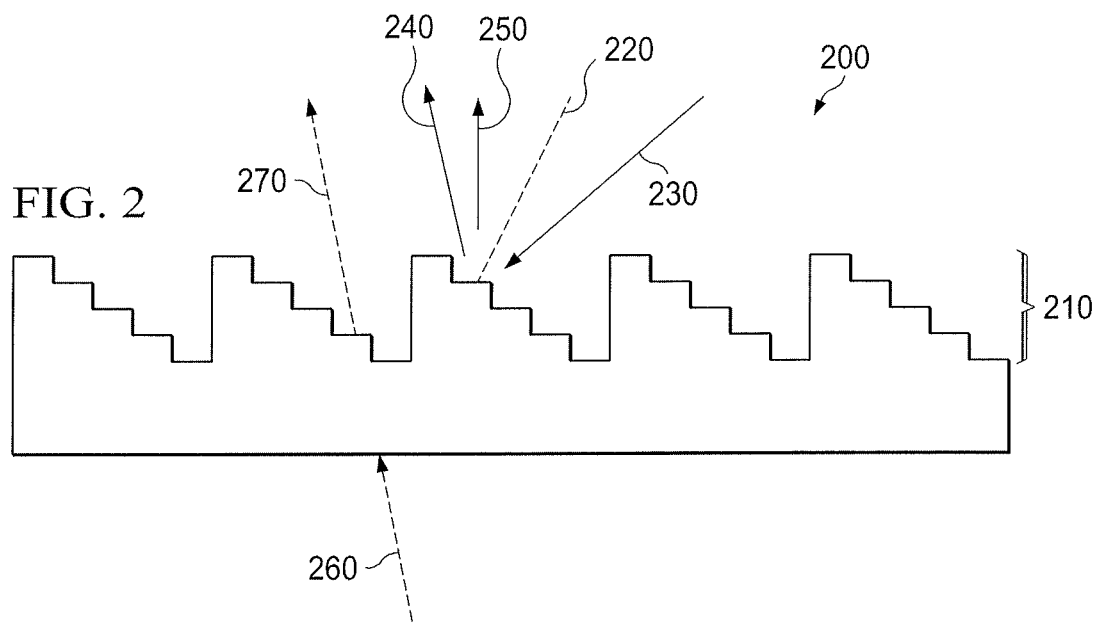
FIG. 2 illustrates an example DOE pattern engraved in an optical component surface in accordance with various embodiments.

FIG. 2 illustrates an example DOE pattern engraved in an optical component surface. The DOE pattern 200 may have a number of diffraction levels 210, with a normal to the blazing plane at 220. In certain embodiments, incident ray 230 may be diffracted and reflected by the DOE pattern 200 mostly in the direction of the first diffraction order 240. In some embodiments, a small fraction of incident ray 230 may be reflected in the direction of the zero diffraction order 250. Rays originating from an object outside, such as ray 260, may be transmitted through the DOE pattern 200, and may continue to propagate as ray 270. In some cases, the ray 270 may be refracted relative to ray 260, while in other cases the ray 270 may propagate without refraction. In particular embodiments, the DOE pattern 200 may be aligned such that rays 240 and 270 propagate on a collinear and/or parallel path.

FIG. 3 illustrates an example reflective spectrum of an optical component comprising a DOE pattern at the first diffraction order. Plotted is the efficiency of reflection in the first diffractive order for an optical component made out of crown glass with a refractive index of 1.525, with a reflective coating maximized at 550 nm at a magnitude of 70% with FWHM of 20 nm, where the DOE pattern has a blazing angle of 20°, a phase level structure with a depth of 0.18 micrometer per level and the reflection design is optimized for 550 nm and 1st diffraction order. The parameter N is the number of phase levels in the DOE pattern, ranging between 2 and 16.

In some embodiments, the inner surface of the optical component may reflect at least 70% of the illumination in the band of 515-535 nm. Additionally, the optical component may transmit at least 80% of the ambient light in the band of 380-710 nm.

FIG. 4 illustrates an example Head Up Display (HUD) system using an optical component comprising a DOE pattern. In particular embodiments, imaging system 400 may comprise a projector 410 projecting electromagnetic radiation 412 generated by an illumination source, such as a light emitting diode (LED) or a laser, through an imaging lens 414 or other optically-powered component. In particular embodiments, electromagnetic radiation 412 may be in the visible range of the electromagnetic spectrum. All the rays within the natural aperture (NA) of lens 414 emerging as rays 416 are then directed at an optical component 420. In particular embodiments, lens 414 is constituted as a lens group comprising a plurality of lenses. Rays 416 are partially reflected off of optical component 420 in a preselected diffraction order becoming rays 422. In some embodiments, rays 422 are reflected as collimated bundles, whereby the optical component 420 acts as a reflective eyepiece. Finally, rays 422 arrive at eye-motion box 424.

Although not shown in FIG. 4, as explained above with respect to FIG. 1, the optical component 420 may also transmit at least a portion of the ambient scenery within a predetermine spectral band in a field-of-view similar to that occupied by the projected image. In accordance with various embodiments, the projected image from the projector 410 maintains substantial boresight alignment with the ambient scenery transmitted through the optical component 420.

Figure 5:
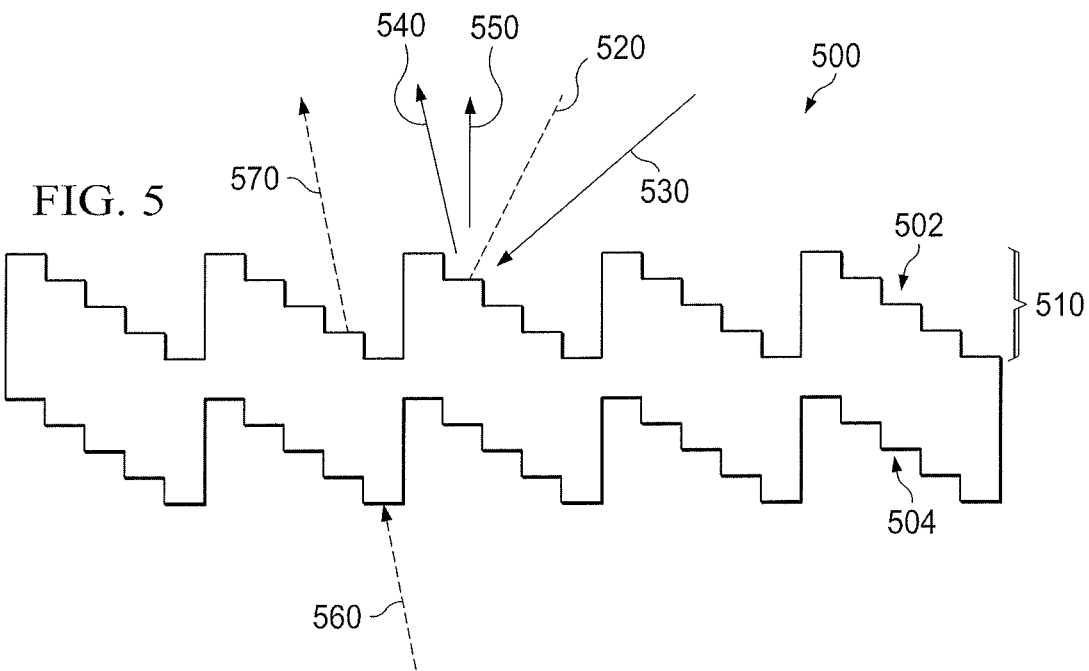
FIG. 5 illustrates an example DOE pattern engraved on both sides of an optical component in accordance with various embodiments.

FIG. 5 illustrates an example DOE pattern engraved in the inner and outer surfaces of an optical component 500. The optical component 500 has an inner surface with the DOE pattern 502 which may have a number of diffraction levels 510, with a normal to the blazing plane at 520. In certain embodiments, incident ray 530 may be diffracted and reflected by the DOE pattern 502 mostly in the direction of the first diffraction order 540. In some embodiments, a small fraction of incident ray 530 may be reflected in the direction of the zero diffraction order 550. The optical component 500 has minimal optical power for transmitted light.

In certain embodiments, the zero power for transmitted light is realized over a specific spectral range, for which the DOE pattern 502 is substantially inefficient. In other embodiments, a DOE pattern 504 that corresponds to the DOE pattern 502 and, in particular, the diffraction levels 510 of the DOE pattern 502, is applied to the outer surface of the optical component 500. As a result, the effect of the DOE pattern 502 on transmitted light is mitigated. Thus, rays originating from an object outside, such as ray 560, may be transmitted through the DOE patterns 502, 504 of the optical component 500 without any focusing effect and may continue to propagate as ray 570. In particular embodiments, the optical component 500 may be aligned such that rays 540 and 570 propagate on a collinear and/or parallel path.

As shown in FIG. 5, the DOE pattern comprises a series of periodic grooves that provide optical power to the inner surface of the optical component 500. In some cases, these grooves may be binary and follow loci that provide optical power to the inner surface of the optical component 500. In other embodiments, rather than diffraction levels 510, a holographic inscription may be equivalently used as the DOE pattern.

As explained above, the morphology of the inner and outer surfaces of the optical component 500 may be designed such that any optical power for transmitted light is greatly reduced or eliminated. This enables optical power to be applied to light reflected, for example from the projector 410 in FIG. 4, while allowing transmitted scenic images to be viewed naturally by the user.

Figure 6:
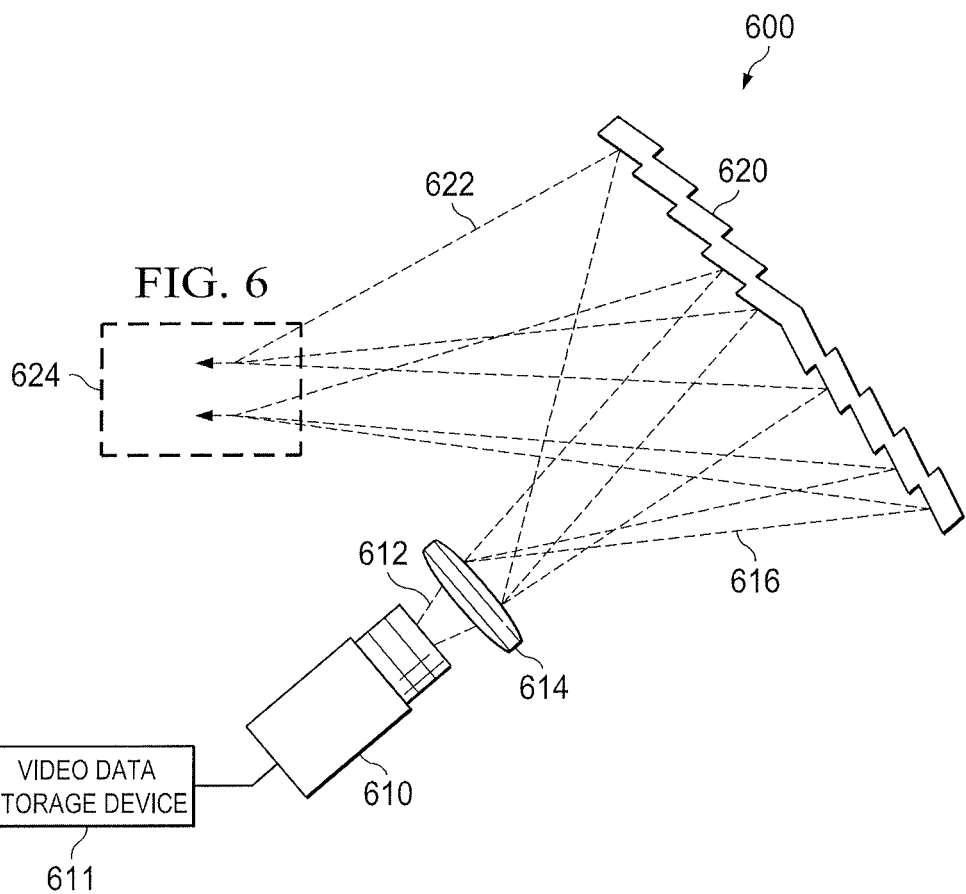
FIG. 6 illustrates an example HUD system using an optical component comprising a DOE pattern engraved on both sides in accordance with various embodiments.

FIG. 6 illustrates an example Head Up Display (HUD) system using an optical component 620 comprising a DOE pattern. In particular embodiments, imaging system 600 may comprise a projector 610 projecting electromagnetic radiation 612 generated by an illumination source, such as a light emitting diode (LED) or a laser, through an imaging lens 614 or other optically-powered component. Although not shown, one skilled in the art will appreciate that the projector 610 may also include an image generator to ascribe an image to the electromagnetic radiation 612 for subsequent viewing by the user. In particular embodiments, electromagnetic radiation 612 may be in the visible range of the electromagnetic spectrum.

All the rays within the numerical aperture (NA) of lens 614 emerging as rays 616 are then aimed at an optical component 620. In particular embodiments, lens 614 is constituted as a lens group comprising a plurality of lens elements. Rays 616 are at least partially reflected off of the optical component 620 in a preselected diffraction order becoming rays 622. In some embodiments, rays 622 are reflected as collimated bundles, where the optical component 620 acts as a reflective eyepiece. Finally, rays 622 arrive at eye-motion box 624.

The optical component 620 has no optical power for transmitted light. As explained above, and referring now to FIGS. 5 and 6, zero power for transmitted light may be realized over a specific spectral range, for which the DOE pattern 502 is substantially inefficient. In other embodiments, a DOE pattern 504 that corresponds to the DOE pattern 502 and, in particular, the diffraction levels 510 of the DOE pattern 502, is applied to the outer surface of the optical component 500. As a result, the effect of the DOE pattern 502 on transmitted light is mitigated.

Referring again to FIG. 6, the projector 610 is coupled to a video data storage device 611. The video data storage device 611 may comprise any number of data storage devices as are known in the art. The video storage device 611 streams video data to the projector 610 for subsequent projection on the optical component 620. The video data may include, for example, video data from an on-board enhanced vision system (EVS), visual representations of data indicating operation status of a vehicle (e.g., speed, heading, fuel level, or power generation), visual representations (e.g., a map and location) of GPS data indicating vehicle coordinates, or visual representations of various conventional gauge data. In some cases, the video storage device 611 streams multiple types of video data to the projector 610 simultaneously.

As explained above, electromagnetic radiation of ambient scenery may form a scenic image when transmitted through the optical component 620. Additionally, the projected electromagnetic radiation may form a synthetic image that is similar to the ambient scenery (e.g., where the video data is from an on-board EVS). In accordance with some embodiments, the projector 610 operates to overlay the reflected synthetic image on the transmitted scenic image. In other embodiments, or additionally, the projector 610 operates to overlay a reflected synthetic symbology image (e.g., where the video data is based on operation status, based on navigation, or based on conventional gauge data) on the transmitted scenic image. Although not required, the video data storage device 611 may stream multiple interleaved streams of video data to the projector 610.

Still referring to FIG. 6, in some embodiments the projector 610 generates a RGB color image. The inner surface of the optical component 620 may reflect at least 70% of the illumination in the bands centered around 450-480 nm, 510-550 nm, and 610-650 nm. Additionally, reflection bands of the inner surface of the optical component 620 may have a FWHM of at least 25 nm or, in alternate embodiments, a FWHM of at most 10 nm.

Thus, in accordance with the present disclosure, at least one embodiment comprises an optical component having a first side disposed opposite of a second side, wherein the first side comprises a binary periodic engraving rendering a Diffractive Optical Element (DOE) pattern and is operable to reflect first light rays within a finite spectral band in a predetermined direction, and wherein the second side is operable to transmit second light rays with substantially no deviation from an incident angle of the second light rays. In particular embodiments, the optical component is the windshield of a vehicle. For example, the optical component may be the windshield of a car or airplane. In other embodiments, the optical component is a mirror of a vehicle. For example, the optical component may be the side or rearview mirror of a car.

In certain embodiments, the first side of the optical component comprises a DOE pattern that comprises a set of fine lines spaced approximately 1 um to 10 um apart. In particular embodiments, the DOE pattern of the first side comprises a diffractive phase level structure that is rendered as a pattern of concentric circles. In further embodiments, a line period of the concentric circles is determined by a finite spectral band of the electromagnetic radiation and a mirror F-number of the combiner.

In some embodiments, the DOE pattern is operable to direct a collimated light bundle to an eye-motion box, the collimated light bundle comprising the first and second light rays. In particular embodiments, the optical component is composed of a material selected from the group consisting of: crown glass, fused silica, a polymer, and photochromic glass. Some embodiments also include a projector operable to emit light rays toward the optical component.

Particular embodiments of the present disclosure may provide one or more technical advantages. For example, certain embodiments may provide an optical component having an arbitrary three-dimensional shape, which may require lower fabrication costs. As another example, certain embodiments may provide an optical component that may reflect particular bands of light in respective particular directions, allowing for the rendering of disparate images in disparate planes and/or locations. As yet another example, certain embodiments may provide an optical component with enhanced light transmission parameters, which may provide for higher contrast of a synthetic image to a scenic image.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A display system comprising:
an optical component having a first surface and a second surface, wherein the first surface comprises a diffractive optical element, the first surface is at least partially reflective within several spectral bands in the visible range; and
a projector system to create a projected image on the optical component, comprising:
an illumination source that emits electromagnetic radiation within a predetermined spectral band;
an image generator that ascribes image characteristics to the radiation; and
an optically-powered component that directs the radiation at the first surface of the optical component;
wherein the diffractive optical element reflects at least a portion of the radiation in a predetermined direction;
wherein the optical component has zero optical power for transmitted light;
wherein the optical component transmits at least a portion of the ambient scenery within a predetermined spectral band within a field-of-view of the projected image;
wherein the projected image maintains substantial boresight alignment with the ambient image; and
wherein the first surface reflection bands comprise a spectral full width at half maximum (FWHM) of at most 10 nm or of at least 25 nm.

2. The display system of claim 1 wherein the first surface of the optical component comprises an eyepiece.

3. The display system of claim 1 wherein the optical component reflects at least a portion of the radiation to an eye-motion box.

4. The display system of claim 1 wherein the first and second surfaces of the optical component are substantially planar.

5. The display system of claim 1 wherein the first surface of the optical component reflects at least 70% of the illumination in the band of 515-535 nm.

6. The display system of claim 1 wherein the optical component transmits at least 80% of the ambient light in the band of 380-710 nm.

7. The display system of claim 1 wherein the diffractive optical element comprises binary periodic engravings having a pitch of between about 1 and 10 micrometers.

8. The display system of claim 7 wherein the binary periodic grooves follow loci that provide optical power to the first surface of the optical component.

9. The display system of claim 7 wherein the diffractive optical element reflects the projected radiation as collimated rays of light.

10. The display system of claim 1 wherein the diffractive optical element comprises an imprinted holographic pattern.

11. The display system of claim 1 wherein the optical component comprises a windshield or a mirror of a vehicle, an aircraft windscreen, or an ocular of optical hardware.

12. The display system of claim 1 wherein the second surface of the optical component comprises a morphology to compensate for an optical power of the first surface and to reduce the optical power of the optical component for transmitted light.

13. The display system of claim 12 wherein the second surface of the optical component comprises a diffractive optical element comprising binary periodic engravings having a pitch of between about 1 and 10 micrometers to reduce the optical power for transmitted light.

14. The display system of claim 12 wherein the second surface of the optical component comprises a holography imprinted pattern to reduce the optical power for transmitted light.

15. The display system of claim 1 wherein the optical component transmits at least a substantial portion of the ambient scenery within a predetermined spectral band within the field-of-view of the projected image.

16. The display system of claim 1 wherein the second surface of the optical component is coated with an anti-reflective coating throughout the visible band of at least 380-710 nm.

17. The display system of claim 1 wherein the ambient electromagnetic radiation forms a scenic image and the projected electromagnetic radiation forms a synthetic imagery overlay of the scenic image.

18. A display system comprising:
   an optical component having a first surface and a second surface, wherein the first surface comprises a diffractive optical element, the first surface is at least partially reflective within several spectral bands in the visible range;
   a projector system to create a projected image on the optical component, comprising:
      an illumination source that emits electromagnetic radiation within a predetermined spectral band;
      an image generator that ascribes image characteristics to the radiation; and
      an optically-powered component that directs the radiation at the first surface of the optical component; and
      a video data storage device to stream video data to the image generator;
   wherein the diffractive optical element reflects at least a portion of the radiation in a predetermined direction;
   wherein the optical component has zero optical power for transmitted light;
   wherein the optical component transmits at least a portion of the ambient scenery within a predetermined spectral band within a field-of-view of the projected image;
   wherein the projected image maintains substantial boresight alignment with the ambient image; and
   wherein the first surface reflection bands comprise a spectral full width at half maximum (FWHM) of at most 10 nm or of at least 25 nm.

19. The display system of claim 18 wherein the video data storage device comprises video data from an enhanced vision system.

20. The display system of claim 18 wherein the video data storage device comprises vehicle operation status data.

21. The display system of claim 18 wherein the video data storage device comprises a map and location based on received GPS data of vehicle coordinates.

22. The display system of claim 18 wherein the video data storage device comprises flight gauge data.

23. The display system of claim 18 wherein the video data storage device streams a plurality of types of video data to the image generator simultaneously.

24. The display system of claim 23 wherein electromagnetic radiation of the ambient scenery forms a scenic image and the projected electromagnetic radiation forms a synthetic image similar to the ambient scenery and overlaid on the scenic image.

25. The display system of claim 23 wherein electromagnetic radiation of the ambient scenery forms a scenic image and the projected electromagnetic radiation forms a synthetic image of symbology overlaid on the scenic image.

26. The display system of claim 25 wherein symbology comprises navigation data.

27. The display system of claim 18 wherein the video data storage device streams interleaved video data to the image generator.

28. A display system comprising:
   an optical component having a first surface and a second surface, wherein the first surface comprises a diffractive optical element, the first surface is at least partially reflective within several spectral bands in the visible range; and
   a projector system to create a projected image on the optical component, comprising:
      an illumination source that emits electromagnetic radiation within the visible range;
      an image generator that ascribes image characteristics to the radiation; and
      an optically-powered component that directs the radiation at the first surface of the optical component;
   wherein the diffractive optical element reflects at least a portion of the radiation in a predetermined direction;
   wherein the optical component has zero optical power for transmitted light;
   wherein the optical component transmits at least a portion of the ambient scenery within a predetermined spectral band within a field-of-view of the projected image;
   wherein the projected image keeps substantial boresight alignment with the ambient image; and
   wherein the first surface reflection bands comprise a spectral full width at half maximum (FWHM) of at most 10 nm or of at least 25 nm.

29. The display system of claim 28 wherein the image generator generates an RGB color image.

30. The optical component of claim 28 wherein the first surface reflects at least 70% of the illumination in the bands centered around 450-480 nm, 510-550 nm, and 610-650 nm.

31. The display system of claim 28 wherein the illumination source comprises one or more light emitting diodes.

32. The display system of claim 28 wherein the illumination source comprises one or more lasers.

* * * * *